Dec. 9, 1941. A. P. JORGENSON Re. 21,973

PAINT-MIXING MACHINE

Original Filed Nov. 16, 1936 2 Sheets-Sheet 1

INVENTOR
Arthur P. Jorgenson
BY
Carl E. Ring
ATTORNEY

Dec. 9, 1941. A. P. JORGENSON Re. 21,973

PAINT-MIXING MACHINE

Original Filed Nov. 16, 1936 2 Sheets-Sheet 2

INVENTOR
Arthur P. Jorgenson
BY
Carl E. King
ATTORNEY

Reissued Dec. 9, 1941

Re. 21,973

UNITED STATES PATENT OFFICE 21,973

PAINT-MIXING MACHINE

Arthur P. Jorgenson, Racine, Wis., assignor, by mesne assignments, to Landon P. Smith, Inc., Irvington, N. J., a corporation of New Jersey Original No. 2,109,233, dated February 22, 1938, Serial No. 110,987, November 16, 1936. Application for reissue February 21, 1940, Serial No. 319,999½

8 Claims. (Cl. 259—72)

My invention relates to improvements in paint-mixing machines.

For the purpose of illustrating my invention, an embodiment thereof is shown in the drawings, wherein Figure 1 is a side elevation of a paint-mixing machine constructed and operating in accordance with my invention, parts being shown broken away and parts being shown in section;

Figure 1:
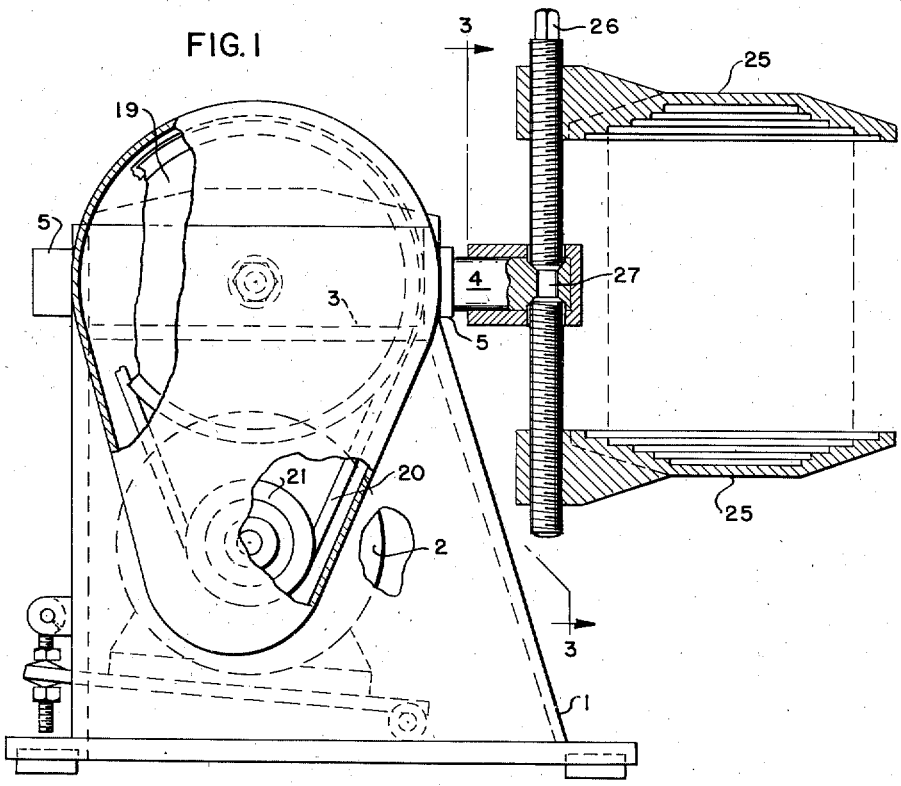
Figure 2:
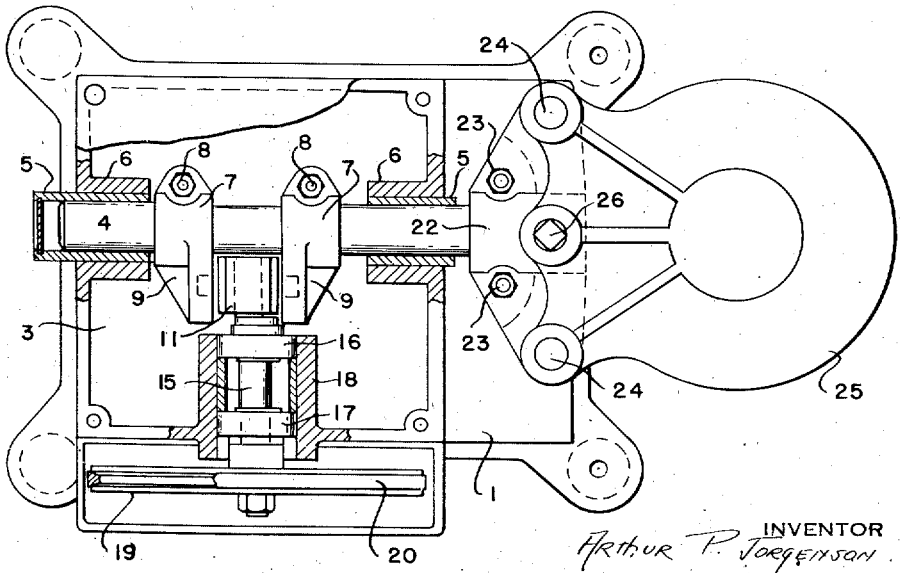
Fig. 2 is a plan view of the machine shown in Fig. 1, parts being shown broken away and in section.
Figure 4:
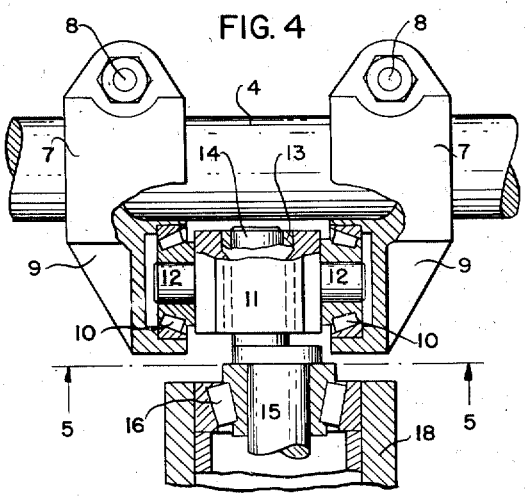
Fig. 4 is a detail, plan view of part of the operating mechanism.
Figure 3:
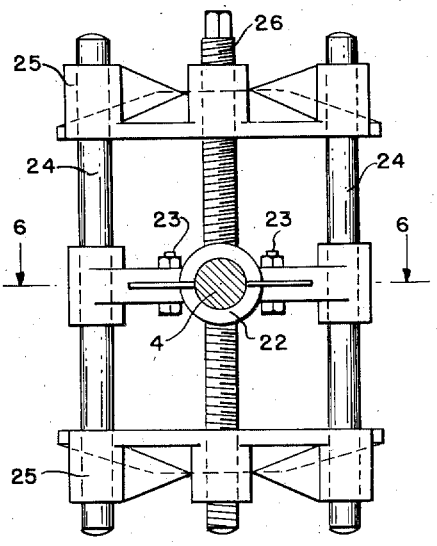
Fig. 3 is a rear elevation of the clamping means for holding a paint can, as seen through the plane 3—3 of Fig. 1.
Figure 5:
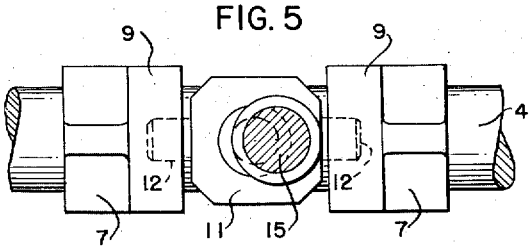
Fig. 5 is an elevation in section viewed through the plane 5—5 of Fig. 4.

As shown in Figs. 1 and 2, the machine of this invention is mounted upon a base casting 1, which is in the form of a rectangular structure having a lower chamber in which a motor 22 is mounted. The base 1 is divided into two compartments by the plate 3 shown in dotted lines in Fig. 1. The plate 3 provides an upper, relatively shallow, rectangular tray for holding a lubricant in which parts of the motion-producing mechanism operate.

A shaft 4 is mounted for movement in bushings 5, which are securely held in place in the base 1 by the bosses 6. A pair of rocker arms 7 is secured to the shaft 4, as shown, and these arms are held firmly in place by clamping bolts 8. On the inner side of the extensions 9 of the rocker arms 7, and facing one another, are bearing housings or recesses in which roller bearings 10 are held.

Movement is imparted to the shaft 4 through a cross-block 11, the projecting pins or trunnions 12 of which are disposed in the recesses in the rocker-arms 7 and are mounted to turn in the bearings 10. At right angles to the axis of the pins 12 is the journal 13 in which the eccentric crank-throw 14 of the shaft 15 turns and slides. The shaft 15 is mounted in bearings 16 and 17. The bearings 16 and 17 are securely held in place in a boss 18 formed as a part of the base 1. The shaft 15 projects outwardly from the base 1 and carries a sheave 19 by which it is driven. The sheave 19 is driven by a belt 20, which passes about a pulley 21 mounted on the armature shaft of the motor 2.

In operation, upon rotation of the drive shaft 15 by the motor 2, the crank-throw 14 causes the cross-block 11 to rotate bodily about the axis of this shaft. The motion of the cross-block 11, which is imparted through the bearings 10 to the rocker-arms 7, causes the driven shaft 4 to oscillate lengthwise and at the same time to execute an oscillating radial movement about its own axis.

A central spreader 22 is secured on an end of the driven shaft 4 by bolts 23. Firmly secured to the central spreader 22 are the vertical guide rods 24, which pass through the ends of the spreader and are fixed thereto. Mounted to slide upon the vertical guide rods 24 are the cup-shape jaws 25 having in their respective adjacent faces circular depressions as shown, to receive paint cans of different diameters.

Figure 6:
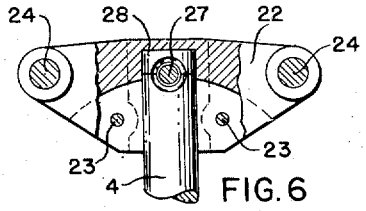
Fig. 6 is a plan view in section, with parts broken away, the section being taken through the plane 6—6 of Fig. 3.

Control of the cup-shape jaws 25 is effected through the clamping-screw 26, which carries a wide groove 27 near its center, on either side of which are disposed screw-threads of right-and-left-hand sense. The clamping screw 26 is held in place against endwise movement by engagement with the groove 27 of the recessed end of shaft 4, as shown clearly in Figs. 1 and 6. A recessed plug 28 further assists in holding clamping screw 26. In assembling the clamping-screw 26 with the shaft 4 and the center spreader 22, the plug 28 is first inserted into the central spreader 22. The screw 26 is then passed downwardly through the opening provided therefor in the spreader 22, entrance being possible by reason of the extra clearance provided as illustrated in Fig. 1. The spreader 22 carrying the screw 26 is then forced onto the shaft 4 until the parts assume the relationship shown in Figs. 1 and 6, after which the clamping screws 23 are tightened to secure the assembly in place. The jaws 25 are then simultaneously drawn into place by rotation of the screw 26, to hold a can of paint, as illustrated by the dotted line in Fig. 1.

Figure 7:
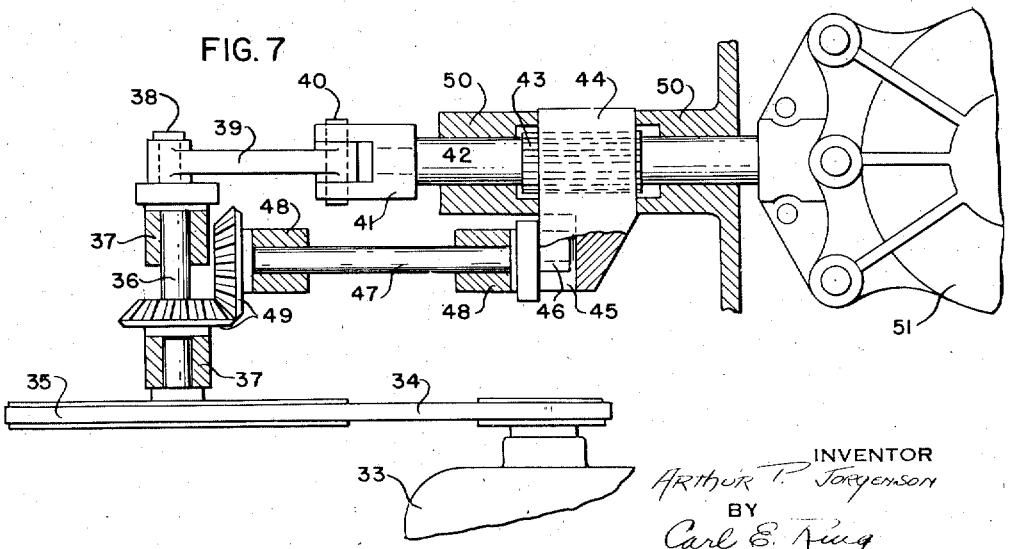
Fig. 7 is a plan view, with parts shown broken away, of a modification.

In the modification shown in Fig. 7, a motor 33 drives a sheave 35 through a belt 34, to drive a shaft 36 which rotates in bearings 37. The shaft 36 carries at its outer end a crank-throw 38 which engages the connecting-rod 39. The connecting-rod 39 is carried in the forked journal 40 formed as a part of the swivel block 41. The swivel block 41 is mounted upon the shaft 42 by means of a swivel connection which permits the shaft 42 to execute rotary movement free of the influence of the swivel block 41, but at the same time being confined to follow the endwise oscillation of the block 41 caused by the crank 38 and connecting-rod 39. The shaft 42 carries a splined portion 43 upon which the rocker-arm 44 is mounted, making a sliding splined connection therewith. The end of the rocker-arm 44 is slotted as shown at 45, to receive the end of a crank-throw 46 carried upon the shaft 47. The shaft 47 is mounted to rotate in bearings 48, and is driven through a pair of bevel gears 49, the driving member of the latter being mounted up on shaft 36.

The shaft 42 is mounted in bearings 50, which permit both endwise and rotary reciprocation of said shaft. Secured to the shaft 42 is a clamp 51 having oppositely approaching cup-shape jaws of the type described above. This apparatus in operation executes simultaneously endwise and rotary oscillation, imparting corresponding movements to the can of paint carried in the clamp 51.

It will be seen that in my improved mixing apparatus the clamp constitutes means for supporting the paint can for rocking movement about the axis of the shaft 4 in Figs. 1 to 6 and about the axis of the shaft 42 in Fig. 7, the axis in either case passing substantially through the center of the can. The clamp also supports the container for straight-line reciprocatory movement along the axis of the shaft 4 in Figs. 1 to 6 and along the axis of the shaft 42 in Fig. 7. The driving mechanism described constitutes means for imparting the rocking movement and the straight-line reciprocatory movement simultaneously to the shaft to the end of which the clamp is fixed.

It will be observed, with reference more particularly to Figs. 2, 4, 5 and 7, that during operation of my improved apparatus, the periods of substantially dead-center in the rocking movement intervene such periods in the straight-line, reciprocatory movement.

I claim as my invention:

1. In a paint mixer, a driven shaft supported for rocking movement about its own axis and for substantially straight-line reciprocatory movement along such axis, said shaft at an end thereof being provided with a pair of jaws movable with respect to each other to grip a can of paint or to release the can, said shaft being provided with a rocker-arm having a recess, a drive shaft disposed substantially perpendicularly to said driven shaft, and transmission means engaging said rocker-arm in said recess thereof and being common with respect to said drive shaft and said rocker-arm and operable upon rotation of said drive shaft to impart simultaneously to said driven shaft and said jaws the respective rocking and substantially straight-line reciprocatory movements with the periods of substantially dead-center in the rocking movement intervening such periods in the substantially straight-line reciprocatory movement.

2. In a paint-mixing machine, the combination comprising a shaft mounted for simultaneous endwise and coaxial-rotary reciprocation, said shaft at an end thereof being provided with a pair of jaws disposed respectively on opposite sides of the axis of said shaft and being movable with respect to each other to grip a can of paint or to release the can, said shaft being provided with a pair of rocker-arms, a drive shaft having an eccentric portion, and a cross-block engaging the ends of said rocker-arms and the eccentric portion of said drive shaft whereby rotation of said drive shaft is communicated in the form of simultaneous endwise and coaxial-rotary reciprocation to said first-named shaft and said jaws.

3. In a paint-mixing machine, the combination comprising a shaft mounted for simultaneous endwise and coaxial-rotary reciprocation, said shaft at an end thereof being provided with a pair of jaws disposed respectively on opposite sides of the axis of said shaft and being movable with respect to each other to grip a can of paint or to release the can, said shaft being provided with rocker-arms, a drive shaft mounted for rotation about an axis substantially at right angles to the axis of said first-named shaft and being provided with an eccentric crank-throw, a cross-block journalled on said crank-throw, trunnions on said cross-block and engaging said rocker-arms, and a supporting base upon which said shafts are mounted.

4. In a paint-mixing machine, the combination comprising a shaft mounted for simultaneous endwise and coaxial-rotary reciprocation, said shaft at an end thereof being provided with a pair of jaws movable with respect to each other to grip a can of paint or to release the can, said shaft being provided with a rocker-arm having a recess, a drive shaft, and transmission means engaging said rocker-arm in said recess thereof and being common with respect to said drive shaft and said rocker-arm and operable upon rotation of said drive shaft to impart simultaneously to said first-named shaft and said jaws the respective endwise and coaxial-rotary reciprocatory movements, with the periods of substantially dead-center in the coaxial-rotary reciprocation intervening such periods in the endwise reciprocation.

5. In a paint-mixing machine, a pair of jaws movable with respect to each other to grip a can of paint or to release the can, a drive shaft supported for rotation about its own axis and provided with an eccentric portion, driven means operable to cause bodily rotary-reciprocatory movement of said jaws about a given axis through substantially the center of a can gripped between said jaws and simultaneous reciprocatory movement of said jaws, transmission means between said eccentric portion and said driven means for imparting simultaneously to said jaws, upon rotation of said drive shaft, the bodily rotary-reciprocatory movement about said axis of the can and the second-mentioned reciprocatory movement, said transmission means comprising a single connecting member pivotally mounted on said eccentric portion, and means pivotally connecting said single connecting member to said driven means.

6. In a paint-mixing machine, a pair of jaws movable with respect to each other to grip a can of paint or to release the can, a drive shaft supported for rotation about its own axis and provided with an eccentric portion, driven means operable to cause bodily rotary-reciprocatory movement of said jaws about a given axis through substantially the center of a can gripped between said jaws and simultaneous reciprocatory movement of said jaws, transmission means between said eccentric portion and said driven means for imparting simultaneously to said jaws, upon rotation of said drive shaft, the bodily rotary-reciprocatory movement about said axis of the can and the second-mentioned reciprocatory movement, said transmission means comprising a single connecting member pivotally mounted on said eccentric portion, and means pivotally connecting said single connecting member to said driven means, the periods of substantially dead-center in the rotary-reciprocatory movement intervening such periods in said second-mentioned movement.

7. A paint-mixing machine comprising a pair of jaws movable with respect to each other to grip a can of paint or to release the can, means to which said jaws are fixed and supporting said jaws for a resultant movement thereof which comprises two distinct, component, reciprocatory movements; at least one of said component movements being in the nature of a reciprocatory movement of said jaws with respect to a substantially horizontal axis, and means for driving said jaw-supporting means.

8. A paint-mixing machine comprising a pair of jaws movable with respect to each other to grip a can of paint or to release the can, means to which said jaws are fixed and supporting said jaws for a resultant movement thereof which comprises two distinct, component, reciprocatory movements; at least one of said component movements being in the nature of a rocking movement about a substantially horizontal axis, the other of said component movements being in the nature of a straight-line reciprocation in a substantially horizontal plane, the periods of dead-center in one of said component movements intervening such periods in the other of said component movements, and means for driving said jaw-supporting means.

ARTHUR P. JORGENSON.